(No Model.)
A. DYER.
CULTIVATOR ATTACHMENT.
No. 482,729. Patented Sept. 20, 1892.
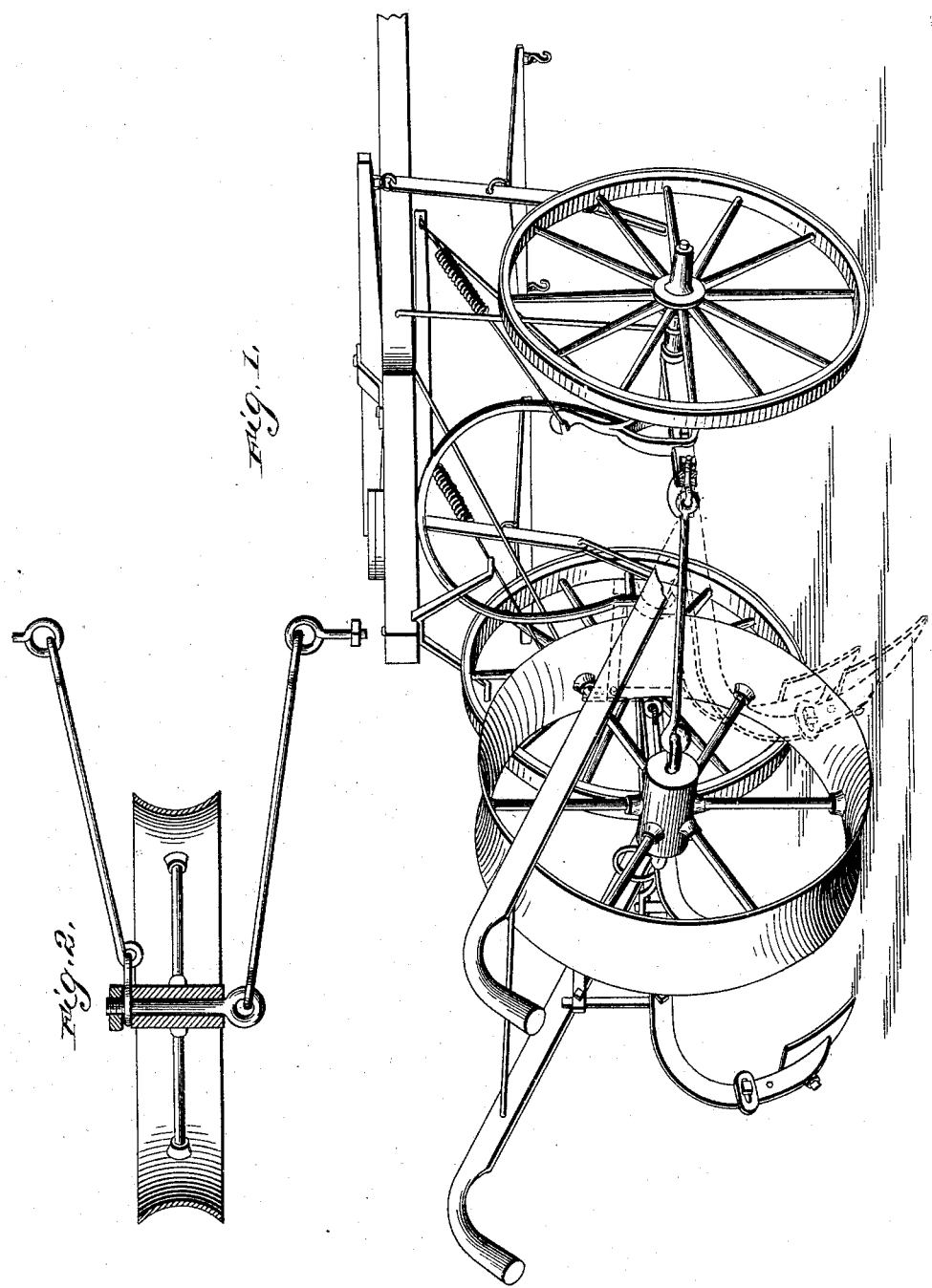
Witnesses:
Inventor:

UNITED STATES PATENT OFFICE.

ALONZO DYER, OF ODESSA, MISSOURI.

CULTIVATOR ATTACHMENT.

SPECIFICATION forming part of Letters Patent No. 482,729, dated September 20, 1892.

Application filed September 28, 1891. Serial No. 407,079. (No model.)

*To all whom it may concern:*

Be it known that I, ALONZO DYER, a citizen of the United States, residing in Odessa, in the county of Lafayette and State of Missouri, have invented a new and useful Attachment to Corn-Cultivators, of which the following is a specification.

My invention consists of a wheel-fender to be attached to and used in conjunction with cultivators for the plowing and cultivation of Indian corn or maize; and the object of the improvement is to furnish and provide a suitable and sufficient continuous fender to throw the earth and clods from the growing plants and protect them from injury from such earth and clods while such plants are in process of cultivation with such cultivators.

In the drawings, Figure 1 shows a cultivator having my attachment. Fig. 2 shows the fender-wheel detached.

I attain these objects by the mechanism illustrated in the accompanying drawings, it being a light wheel made of metal or other suitable material, of about thirty inches in diameter, to be attached with a suitable axle, rods, and bolts (shown in the drawings) to the beam of the cultivator, so that said wheel may revolve and move along the surface of the ground alongside the share or plowing-point of the cultivator and just over the row of growing plants. The tire or outer circumference is to be about eight inches in width and beveled or made concave toward the middle of such tire, so that such tire may present a grooved surface of the depth of groove of about three inches, the groove in the rim or tire accomplishing the double purpose of protecting the plants and fending off from the inner beveled surface of such rim on both sides of the wheel the clods and dirt thrown by the share of the cultivator on such wheel, which clods and dirt would otherwise crush or cover up the growing plants, the revolutions of the wheel preventing its use as a fender being interferred with by impediment or accumulation of earth.

What I do claim as my invention, and desire to secure by Letters Patent, is—

In a fender for plants, the combination, with a plow or a straddle-row cultivator, of a wheel having suitable connection therewith and a concave or hollow rim adapted to run over and protect a row of growing plants, substantially as shown and described.

ALONZO DYER.

Witnesses:
 N. M. HOUX,
 JAMES F. COLLINS.